Figure 1:
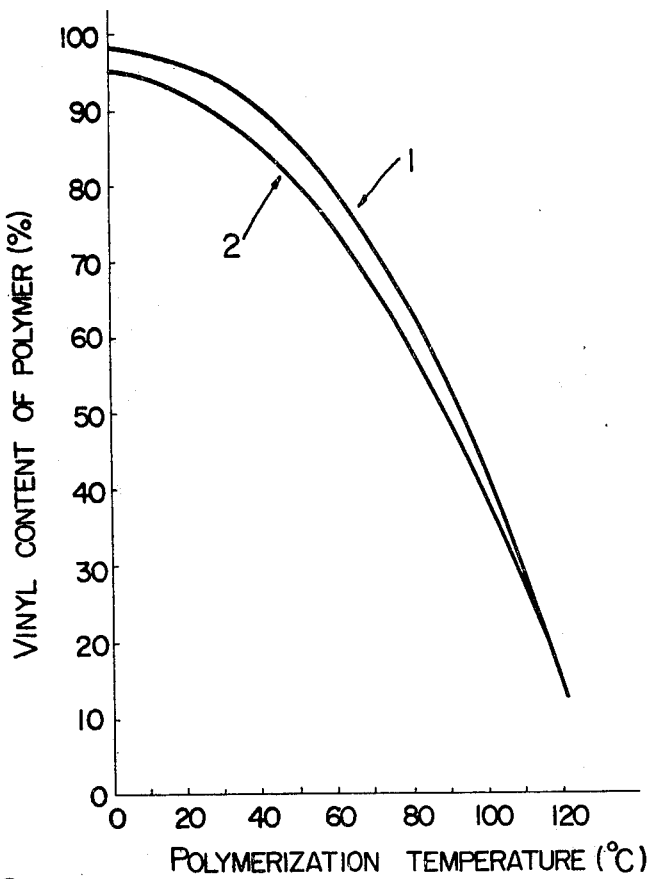

United States Patent [19]

Takeuchi et al.

[11] 4,367,325

[45] Jan. 4, 1983

[54] STYRENE-BUTADIENE RANDOM COPOLYMER AND PROCESS FOR THE PRODUCTION THEREOF

[75] Inventors: Yasumasa Takeuchi, Yokkaichi; Noboru Ohshima, Suzuka; Mitsuhiko Sakakibara; Funio Tsutsumi, both of Yokkaichi, all of Japan

[73] Assignee: Japan Synthetic Rubber Co., Ltd., Tokyo, Japan

[21] Appl. No.: 254,517

[22] Filed: Apr. 15, 1981

[30] Foreign Application Priority Data

Apr. 22, 1980 [JP] Japan .................................. 55-53945

[51] Int. Cl.$^3$ ............................................. C08F 236/10
[52] U.S. Cl. ...................................... 526/340; 526/73; 526/180; 526/181
[58] Field of Search ........................ 526/180, 181, 340

[56] References Cited

U.S. PATENT DOCUMENTS

| | | | |
|---|---|---|---|
| 2,975,160 | 3/1961 | Zelinski | 526/340 |
| 3,301,840 | 1/1967 | Zelinski | 526/181 |
| 3,366,611 | 1/1968 | Wofford | 526/340 |
| 3,716,495 | 2/1973 | Hsieh | 526/340 |
| 3,773,732 | 11/1973 | Dillenschneider | 526/181 |
| 3,980,625 | 9/1976 | Sakamoto | 526/340 |
| 4,022,959 | 5/1977 | Summer et al. | 526/180 |
| 4,139,690 | 2/1979 | Torigoe et al. | 526/174 |
| 4,230,841 | 10/1980 | Prudence | 526/181 |

*Primary Examiner*—Paul R. Michl
*Attorney, Agent, or Firm*—Oblon, Fisher, Spivak, McClelland & Maier

[57] ABSTRACT

Styrene-butadiene random copolymers having an average vinyl content of at least 70%, a breadth of the distribution of vinyl contents of at least 20%, a Mooney viscosity (ML$_{1+4}$, 100° C.) of 10 to 150, and a styrene content of about 3 to 30% by weight. They are prepared by copolymerizing styrene and butadiene in a hydrocarbon solvent in the presence of an organolithium initiator and a Lewis base and, if necessary, an anionic surface active agent containing —SO$_3$M or —OSO$_3$M (wherein M is Na, K, Rb or Cs) under temperature-raising conditions. They are rubber materials having low rolling resistance and high wet skid resistance.

15 Claims, 2 Drawing Figures

STYRENE-BUTADIENE RANDOM COPOLYMER AND PROCESS FOR THE PRODUCTION THEREOF

This invention relates to a styrene-butadiene random copolymer having a low rolling resistance and a high wet skid resistance and a process for producing the same, and more particularly to a styrene-butadiene random copolymer having an average vinyl content of at least 70% and a breadth of the distribution of vinyl contents of at least 20% and a process for producing the same by random-copolymerizing styrene and 1,3-butadiene in a hydrocarbon solvent in the presence of an organolithium initiator under temperature-raising conditions.

Recently, in view of the requirements of low fuel consumption and running safety for automobiles, a rubber material having low rolling resistance and high wet skid resistance has been increasingly required as a rubber for an automobile tire tread. These properties, however, are inconsistent with each other and no single rubber having low rolling resistance and high wet skid resistance at the same time has been discovered. For balancing these properties, therefore, a rubber composition of dissimilar rubber materials has heretofore been used. For example, a rubber composition of a styrene-butadiene copolymer having a bound styrene content of 10 to 30% by weight and a vinyl content of 20% or less, which has relatively high wet skid resistance, and polybutadiene having a vinyl content of 20% or less, which has low rolling resistance and high abrasion resistance, has been used as a tire tread rubber for passenger car.

Rubber compositions of a styrene-butadiene copolymer and a polybutadiene, however, are not necessarily satisfactory in both wet skid resistance and rolling resistance.

Additionally, a rubber composition containing polybutadiene of a high vinyl content has been recently proposed to meet the foregoing requirements. It has been revealed, however, that the rubber composition has the disadvantage that when it is intended to improve the wet skid resistance and rolling resistance the fracture properties and abrasion resistance are seriously reduced.

As a result of extensive studies on a rubber material which has low rolling resistance, which is a measure of the low fuel consumption, and high wet skid resistance, which is a measure of the running safety, and furthermore which has high fracture properties and abrasion resistance, it has been found that a styrene-butadiene copolymer having a Mooney viscosity ($ML_{1+4}$, 100° C.) of about 10 to 150, an average vinyl content of about 70% or more, and a bound styrene content of about 3 to 30% by weight is improved in fracture properties and abrasion resistance by increasing the breadth of the distribution of vinyl contents, and that as compared at the same average vinyl content, the styrene-butadiene copolymer having the increased breadth of the distribution of vinyl contents is improved in the wet skid resistance over a styrene-butadiene copolymer having a narrow breadth of the distribution of vinyl contents.

According to this invention, there is provided a styrene-butadiene random copolymer having an average vinyl content of at least 70%, a breadth of the distribution of vinyl contents of at least 20%, a Mooney viscosity ($ML_{1+4}$, 100° C.) of about 10 to 150, and a styrene content of 3 to 30% by weight.

This invention further provides a process for producing a styrene-butadiene random copolymer having an average vinyl content of at least 70%, a breadth of the distribution of vinyl contents of at least 20%, a Mooney viscosity ($ML_{1+4}$, 100° C.) of 10 to 150, and a styrene content of 3 to 30% by weight by random-copolymerizing styrene and butadiene in a hydrocarbon solvent in the presence of an organolithium initiator, characterized in that the random-copolymerization is performed in the presence of a Lewis base or both Lewis base and anionic surface active agent containing —$SO_3M$ or —$OSO_3M$ (wherein M is Na, K, Rb or Cs) and under temperature-raising conditions.

Figure 2:
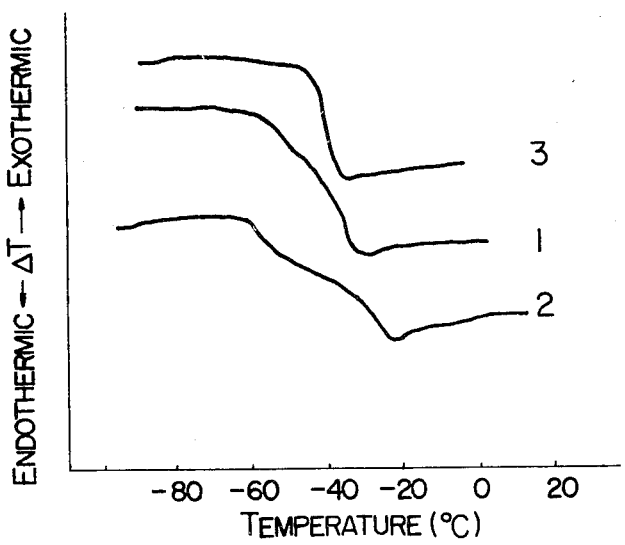

This invention will be described in detail below referring to the accompanying drawings, in which FIG. 1 is a chart showing the dependence of the vinyl content of a polymer on the polymerization temperature; and FIG. 2 shows a DSC thermogram obtained by a differential scanning calorimeter (DSC). In FIG. 2, Curve 1 refers to the thermogram of the styrene-butadiene copolymer of Example 1, Curve 2 refers to the thermogram of the styrene-butadiene copolymer of Example 3, and Curve 3 refers to the thermogram of the styrene-butadiene copolymer of Comparative Example 1.

The organolithium initiators which may be used include methyllithium, ethyllithium, n-butyllithium, sec-butyllithium, tert-butyllithium, amyllithium, phenyllithium, tolyllithium, vinyllithium, propenyllithium, tetramethylenedilithium, pentamethylenedilithium, hexamethylenedilithium, decamethylenedilithium, 1,3-bis(1-lithio-3-methylphenyl)benzene, 1,3-bis(1-lithio-1,3-dimethylpentyl)benzene, and 1,1,4,4-tetraphenyl-1,4-dilithiobutane.

Although the amount of the organolithium initiator used varies depending on the molecular weight (Mooney viscosity) of the copolymer to be formed, it is usually, in terms of lithium atoms, 0.05 to 10 milligram atoms and preferably 0.1 to 5 milligram atoms per 100 g of the total monomer.

Preferred examples of Lewis bases which may be used are ethers and tertiary amines having high Lewis basicity. Examples thereof are ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, tetraethylene glycol dimethyl ether, tetrahydrofuran, 2-methoxytetrahydrofuran, 2-methoxymethyltetrahydrofuran, 2,5-dimethoxymethyltetrahydrofuran, and dioxane, and tertiary amines, such as N,N,N',N'-tetramethylethylenediamine, N,N,N',N'-tetraethylethylenediamine, triethylenediamine, N-methylmorpholine, and N-ethylmorpholine.

The amount of the Lewis base used is 0.2 to 500 moles, preferably 0.5 to 100 moles, per gram atom of the lithium in the organolithium initiator.

The anionic surface active agents containing —$SO_3M$ or —$OSO_3M$ wherein M is Na, K, Rb or Cs which are used in combination with the Lewis bases in this invention include alkylarylsulfonates, amide-bound sulfonates, ester-bound sulfonates, sulfuric ester salts of higher alcohols, and ester-bound sulfuric ester salts, as described in U.S. Pat. No. 4,139,690.

The amount of the anionic surface active agent used is about 1.0 gram atom or less (on the basis of alkali metal atoms) per gram atom of the lithium in the organolithium initiator.

The hydrocarbon solvents which may be used in the random-copolymerization include aromatic hydrocarbons, such as benzene, toluene, xylene and ethylbenzene, alicyclic hydrocarbons, such as cyclohexane, methylcyclopentane and cyclooctane, and aliphatic hydrocarbons, such as propane, butane, pentane, hexane, heptane, octane and decane. These hydrocarbons may be used alone or in combination of two or more.

Of these hydrocarbon solvents, the alicyclic and aliphatic hydrocarbons are preferred in that the random-copolymerization therein in the presence of the organolithium initiator and the Lewis base brings about a further improvement in fracture properties without adversely affecting the rolling resistance.

The hydrocarbon solvent may be used in an amount of 1 to 20 parts by weight per part by weight of the total monomer.

The average vinyl content of the styrene-butadiene random copolymer of this invention is controlled to at least 70%, preferably at least 75%, though it varies depending upon the type and amount of the Lewis base, the type of the polymerization solvent, the polymerization temperature, and the like. When the average vinyl content is less than 70%, no satisfactory wet skid resistance can be obtained.

Since the distribution of vinyl contents varies depending on the history of the polymerization temperature, the random-copolymerization is carried out under the temperature-raising conditions while controlling the polymerization temperature so that the breadth of the distribution of vinyl contents is at least 20%, preferably at least 30%. When the breadth of the distribution of vinyl contents is less than 20%, the abrasion resistance, wet skid resistance and fracture properties cannot be improved.

The term "breadth of the distribution of vinyl contents" used herein means the difference (expressed in percent (%)) between the vinyl content at the polymerization initiation temperature, i.e., the minimum polymerization temperature (Ti) and the vinyl content at the maximum polymerization temperature (Tm) during the random-copolymerization obtained by tracing the change of polymerization temperature with the lapse of time in the polymerization under the temperature-raising conditions and measuring said vinyl contents because the polymerization temperature and the vinyl content are correlated so long as the type and amount of Lewis base and the polymerization solvent are constant as indicated in FIG. 1.

In FIG. 1, Curve 1 refers to the case where the polymerization initiator is n-butyllithium (n-BuLi), the Lewis base is diethylene glycol dimethyl ether (DIGLYME), the molar ratio of n-BuLi to DIGLYME is 1:1, and the hydrocarbon solvent is toluene, and Curve 2 refers to the case where n-BuLi and DIGLYME are used in a molar ratio of 1:2, and the solvent is a mixture of cyclohexane and hexane in a weight ratio of 90:10.

Although the polymerization temperature is not critical, the polymerization initiation temperature (Ti) is preferably $-20°$ C. to $+50°$ C. On the other hand, the temperature difference ($\Delta T$) between the polymerization initiation temperature (Ti) and the maximum polymerization temperature (Tm) on the way of the polymerization or at the end of the polymerization is preferably adjusted to 40° C. or more so as to provide the breadth of the distribution of vinyl contents of at least 20%. The maximum polymerization temperature (Tm) is preferably 130° C. or less. When the maximum polymerization temperature (Tm) exceeds 130° C., the amount of the low molecular weight portion in the polymer increases, which is not desirable from a standpoint of the rolling resistance.

The random-copolymerization under the temperature-raising conditions from the start of polymerization to the end of polymerization can be carried out in various manners. It can be conducted by, for example, an adiabatic polymerization method by which the temperature is raised linearly along with the polymerization conversion by minimizing the heat loss from the start of polymerization to the end of polymerization, a method by which the heat removal from the outside of a reactor is controlled to allow an isothermal polymerization to be effected until the polymerization conversion reaches a predetermined level and subsequently the polymerization is carried out while raising the temperature to the end of the polymerization, and a method by which the polymerization temperature is stepwise raised every time the polymerization conversion reaches a predetermined level.

It is preferred to start the polymerization of the invention by adding the organolithium initiator to the system in which the hydrocarbon solvent, monomers and Lewis base, or furthermore the anionic surface active agent are present. Alternatively, the polymerization may be initiated by introducing the organolithium initiator and Lewis base, or the organolithium initiator, Lewis base and anionic surface active agent, which have been previously brought into contact with one another, into the system of the hydrocarbon solvent and monomers.

It is preferred to add a multi-vinyl aromatic compound to the system to reduce the cold flow of the polymer. Preferred examples of the multi-vinyl aromatic compound are divinylbenzene, trivinylbenzene, divinylnaphthalene and trivinylnaphthalene. The amount of the multi-vinyl aromatic compound used is usually 0.05 to 2 moles per mole of the organolithium initiator.

When a predetermined conversion of polymerization is attained, an antioxidant and a terminator such as water, an alcohol and a phenol, are added to terminate the polymerization. Thereafter, the polymer thus formed is separated and dried to obtain the objective polymer.

The styrene content of the styrene-butadiene copolymer of this invention is 3 to 30% by weight, preferably 3 to 20% by weight. When the styrene content is less than 3% by weight, the fracture properties and abrasion resistance are not improved. On the other hand, when it is more than 30% by weight, the rolling resistance is unsatisfactory.

The Mooney viscosity ($ML_{1+4}$, 100° C.) of the styrene-butadiene copolymer of this invention is 10 to 150, preferably 20 to 120. Polymers having viscosities of less than 10 are not satisfactory in respect of the tensile strength and rolling resistance, whereas polymers having viscosities of more than 150 have poor processability.

The fact that the breadth of the distribution of vinyl contents of the styrene-butadiene random copolymer of this invention is broader than the conventional one can be appreciated from the broad glass transition region in the DSC thermogram obtained by a DSC as shown in FIG. 2 and from the broad peak width of tan $\delta$ in the loss tangent (tan δ)-temperature curve obtained by a viscoelastic loss measurement method.

By the term "styrene-butadiene random copolymer" as used herein is meant a styrene-butadiene random copolymer wherein the block styrene content of the bound styrene is 10% by weight or less, as measured by an oxidative decomposition method as described in I. M. Kolthoff et al., J. Polymer Sci., Vol. 1, page 429 (1946).

The styrene-butadiene random copolymer of this invention are excellent in wet skid resistance and rolling resistance and are improved in fracture properties and abrasion resistance over the conventional styrene-butadiene copolymers.

The following Examples and Comparative Examples are given to illustrate the invention in greater detail although the invention is not limited thereto.

In each Example, the microstructure of the polybutadiene portion was examined by the method proposed by D. Morero [Chim e Ind., 41, 758 (1959)], and the styrene content of the copolymer was determined from the calibration curve using the absorbance at 699 cm$^{-1}$. The conversion of polymerization was calculated from the total solid content which was measured by evaporation to dryness of the polymer solution. The glass transition temperature was measured by the use of a Dupont Model 990 differential scanning calorimeter (rate of temperature increase: 20° C./min).

In order to indicate the rolling resistance, the resillience at 70° C. and the heat build-up temperature measured using a Goodrich flexometer were used, and the wet skid resistance was measured by a skid tester.

EXAMPLES 1 TO 3 AND COMPARATIVE EXAMPLES 1 TO 4

Toluene, styrene, 1,3-butadiene and diethylene glycol dimethylether in the amounts shown in Table 1 were placed in a 50-liter reactor in an atmosphere of nitrogen, and using n-butyllithium as a polymerization initiator, they were polymerized for 2 hours under the conditions shown in Table 1.

In Examples 1 and 2, and Comparative Examples 3 and 4, the polymerization was performed by an adiabatic method from the start of the polymerization. In Example 3, the polymerization was performed isothermally at 0° C. until the polymerization conversion reached 30% and subsequently the polymerization was continued while raising the temperature by heating from the outside of the reactor.

To the polymer solution thus obtained was added 2,6-di-tert-butyl-p-cresol in an amount of 0.7 parts by weight per 100 parts by weight of the polymer, and then the solvent was removed by steam stripping. The resulting polymer mixture was dried on rolls maintained at 100° C. to obtain the desired polymer. Some of the properties of the polymer thus obtained are shown in Table 1.

Using the polymers thus obtained, compounds were prepared according to the formulation shown in Table 2 with an internal mixer and a roll, and they were vulcanized at 145° C. for 45 minutes. The properties of the thus-vulcanized products are shown in Table 3.

FIG. 2 is a DSC thermogram obtained by a differential scanning calorimeter of the styrene-butadiene copolymers of Examples 1 and 3 (Curves 1 and 2, respectively) and the styrene-butadiene copolymer of Comparative Example 1 (Curve 3).

From Table 3, it can be seen that:

as compared with the styrene-butadiene copolymer of Comparative Example 1, those of Examples 1 and 2 are improved in modulus, tensile strength, elongation and abrasion;

as compared with the styrene-butadiene copolymer of Comparative Example 2, that of Example 1 is improved in modulus, tensile strength and elongation;

the styrene-butadiene copolymer of Comparative Example 3 is inferior in tensile strength, elongation and abrasion to those of Examples 1 to 3;

the styrene-butadiene copolymer of Comparative Example 4 is inferior in resillience and heat build-up to those of Examples 1 to 3; and the styrene-butadiene copolymer of Comparative Example 5 is seriously inferior in wet skid resistance to those of Examples 1 and 2.

TABLE 1

|  | Example | | | Comparative Example | | | | |
| --- | --- | --- | --- | --- | --- | --- | --- | --- |
|  | 1 | 2 | 3 | 1 | 2 | 3 | 4 | 5 |
| Polymerization Conditions | | | | | | | | |
| Toluene (kg) | 35 | 30 | 25 | 30 | 30 | 35 | 35 | 30 |
| 1,3-Butadiene (kg) | 4.75 | 2.85 | 4.25 | 2.85 | 2.55 | 5.00 | 3.25 | 4.75 |
| Styrene (kg) | 0.25 | 0.15 | 0.75 | 0.15 | 0.45 | 0 | 1.75 | 0.25 |
| n-BuLi (g) | 2.50 | 1.50 | 2.75 | 1.70 | 1.80 | 2.25 | 3.25 | 2.60 |
| DIGLYME (g) | 5.23 | 3.14 | 5.75 | 3.56 | 3.77 | 4.71 | 6.80 | 5.44 |
| Polymerization Initiation Temperature (Ti) (°C.) | 20 | 30 | 0 | 50 | 45 | 22 | 17 | 30 |
| Maximum Temperature (Tm) (°C.) | 91 | 80 | 90 | 50 | 45 | 92 | 89 | 115 |
| Tm − Ti = ΔT (°C.) | 71 | 50 | 90 | 0 | 0 | 70 | 72 | 85 |
| Polymerization Conversion (%) | 100 | 100 | 100 | 100 | 100 | 100 | 100 | 100 |
| Properties of Polymer | | | | | | | | |
| Bound Styrene (%) | 5.0 | 5.0 | 15.0 | 5.0 | 15.0 | 0 | 35 | 5.0 |
| Microstructure of Butadiene Portion (%) | | | | | | | | |
| Vinyl | 82 | 82 | 85 | 82 | 85 | 82 | 81 | 65 |
| Cis | 7 | 6 | 5 | 8 | 5 | 7 | 8 | 12 |
| Trans | 11 | 12 | 10 | 10 | 10 | 11 | 11 | 23 |
| Breadth of Distribution of Vinyl Contents (%)*[1] | 44 | 30 | 45 | 0 | 0 | 44 | 40 | 72 |

TABLE 1-continued

|  | Example | | | Comparative Example | | | | |
| --- | --- | --- | --- | --- | --- | --- | --- | --- |
|  | 1 | 2 | 3 | 1 | 2 | 3 | 4 | 5 |
| Mooney Viscosity (ML$_{1+4}$, 100° C.) | 50 | 51 | 53 | 49 | 52 | 50 | 50 | 49 |

Note:
*1: Calculated based on the dependence of the vinyl content on the polymerization temperature: (vinyl content at Ti) − (vinyl content at Tm) (%)
n-BuLi: n-Bultyllithium
DIGLYME: Diethylene glycol dimethyl ether

TABLE 2

|  | Parts by weight |
| --- | --- |
| Styrene-butadiene copolymer or polybutadiene rubber | 100 |
| Carbon black (ISAF) | 50 |
| Aromatic process oil*3 | 10 |
| Zinc oxide | 4 |
| Stearic acid | 2 |
| Accelerator MSA*1 | 0.540 |
| DM*2 | 0.335 |
| Sulfur | 2.0 |

Note:
*1: N—oxydiethylene-2-benzothiazylsulfenamide (produced by Ouchi Shinko Kagaku Kogyo Co., Ltd., Japan)
*2: Dibenzothiazyl disulfide (produced by Ouchi Shinko Kagaku Kogyo Co., Ltd., Japan)
*3: High aromatic process oil (produced by Japan Synthetic Rubber Co., Ltd.)

TABLE 3

|  | Example | | | Comparative Example | | | | |
| --- | --- | --- | --- | --- | --- | --- | --- | --- |
|  | 1 | 2 | 3 | 1 | 2 | 3 | 4 | 5 |
| 300% Modulus (kg.f/cm$^2$)*1 | 140 | 148 | 139 | 118 | 130 | 135 | 140 | 135 |
| Tensile Strength*1 (kg.f/cm$^2$) | 210 | 205 | 220 | 195 | 205 | 200 | 220 | 220 |
| Elongation (%)*1 | 410 | 400 | 420 | 390 | 400 | 395 | 390 | 420 |
| Hardness (JIS-A)*1 | 72 | 73 | 72 | 72 | 72 | 72 | 72 | 72 |
| 70° C. Dunlop Resillience (%)*2 | 65.5 | 65.0 | 64.0 | 62.5 | 62.0 | 64.0 | 60 | 65.0 |
| Heat Build-up Temperature ΔT (°C.)*3 | 19 | 20 | 20 | 20 | 22 | 20 | 25 | 20 |
| Wet Skid (index)*4 | 110 | 105 | 115 | 100 | 105 | 95 | 120 | 85 |
| Lambourn Abrasion (index)*5 | 118 | 115 | 110 | 100 | 105 | 95 | 120 | 120 |

Note:
*1: Measured in accordance with JIS K6301.
*2: Measured by the method described in B.S 903, part 22.
*3: Measured in accordance with Goodrich Heat Build-up ASTM D623/58 (Method A).
*4: Measured on an indoor wet asphalt road at 20° C. by the use of a skid tester (produced by Stanley Corp., England) and indicated as index using the data in Comparative Example 1 as 100. The larger the value, the higher the wet skid resistance.
*5: Measured at a slip ratio of 30% and a temperature of 25° C. by the use of a Lambourn abrasion tester and indicated as index using the data in Comparative Example 1 as 100. The greater the value, the higher the abrasion resistance.

EXAMPLES 4 TO 6 AND COMPARATIVE EXAMPLE 6

A cyclohexane/n-hexane (90/10 by volume) mixture, styrene, 1,3-butadiene and diethylene glycol dimethyl ether in the amounts shown in Table 4 were placed in a 50-liter reactor in an atmosphere of nitrogen, and using n-butyllithium as a polymerization initiator, they were polymerized for 2 hours under the conditions shown in Table 4.

The polymerization was performed by an adiabatic method wherein there was neither heat income from nor heat outgo to exterior.

The polymer thus obtained was formulated and vulcanized in the same manner as in Examples 1 to 3, and the properties of the vulcanized product thus obtained were examined. The results are shown in Table 5.

It can be seen from Table 5 that as compared with the styrene-butadiene copolymer of Comparative Example 6, those of Examples 4 to 6 are improved in tensile strength and elongation.

TABLE 4

|  | Example | | | Comparative Example |
| --- | --- | --- | --- | --- |
|  | 4 | 5 | 6 | 6 |
| Polymerization Conditions |  |  |  |  |
| Cyclohexane/n-hexane (kg) | 30 | 35 | 35 | 30 |
| 1,3-Butadiene (kg) | 4.60 | 4.25 | 4.25 | 2.76 |
| Styrene (kg) | 0.40 | 0.75 | 0.75 | 0.24 |
| n-Butyllithium (g) | 2.56 | 2.98 | 2.90 | 1.57 |
| Diethylene Glycol Dimethyl Ether (g) | 10.72 | 12.48 | 12.14 | 6.57 |
| Potassium Dodecylbenzene Sulfonate (g) | 0.62 | 1.20 | 0 | 0.42 |
| Polymerization Initiation Temperature (Ti) (°C.) | 0 | 5 | 5 | 41 |
| Maximum Polymerization Temperature (Tm) (°C.) | 85 | 80 | 80 | 41 |
| Tm − Ti = ΔT (°C.) | 85 | 75 | 75 | 0 |
| Polymerization Conversion (%) | 100 | 100 | 100 | 100 |
| Properties of Polymer |  |  |  |  |
| Bound Styrene (%) | 8.0 | 15.0 | 15.0 | 8.0 |
| Microstructure of Butadiene Portion (%) |  |  |  |  |
| Vinyl | 83 | 80 | 80 | 85 |
| Cis | 5 | 7 | 7 | 5 |

TABLE 4-continued

|  | Example | | | Comparative Example |
|---|---|---|---|---|
|  | 4 | 5 | 6 | 6 |
| Trans | 9 | 13 | 13 | 10 |
| Breadth of Distribution of Vinyl Contents (%) | 41 | 36 | 36 | 0 |
| Mooney Viscosity (ML$_{1+4}$, 100° C.) | 50 | 51 | 50 | 53 |

TABLE 5

|  | Example | | | Comparative Example |
|---|---|---|---|---|
|  | 4 | 5 | 6 | 6 |
| 300% Modulus (kg.f/cm$^2$) | 146 | 139 | 148 | 135 |
| Tensile Strength (kg.f/cm$^2$) | 210 | 220 | 230 | 200 |
| Elongation (%) | 440 | 415 | 410 | 405 |
| Hardness (JIS A) | 72 | 72 | 73 | 72 |
| 70° C. Dunlop Resillience (%) | 64.5 | 64.0 | 64.5 | 62.5 |
| Heat Build-up Temperature (ΔT) (°C.) | 19 | 20 | 20 | 20 |
| Wet Skid (index) | 115 | 120 | 125 | 105 |
| Lambourn Abrasion (index) | 110 | 120 | 120 | 105 |

Note:
Measuring methods and conditions were the same as described in Table 3.

What is claimed:

1. A styrene-butadiene random copolymer having an average vinyl content of at least 70%, a breadth of the distribution of vinyl contents of at least 20%, a Mooney viscosity (ML$_{1+4}$, 100° C.) of 10 to 150, and a styrene content of 3 to 30% by weight.

2. A styrene-butadiene random copolymer as claimed in claim 1, wherein the average vinyl content is at least 75%.

3. A styrene-butadiene random copolymer as claimed in claim 1 or 2, wherein the breadth of the distribution of vinyl contents is at least 30%.

4. A styrene-butadiene random copolymer as claimed in claim 3, wherein the styrene content is 3 to 20% by weight.

5. A styrene-butadiene random copolymer as claimed in claim 4, wherein the Mooney viscosity (ML1+4, 100° C.) is 20 to 100.

6. A process for producing a styrene-butadiene random copolymer having an average vinyl content of at least 70%, a breadth of the distribution of vinyl contents of at least 20%, a Mooney viscosity (ML$_{1+4}$, 100° C.) of 10 to 150, and a styrene content of 3 to 30% by weight by copolymerizing styrene and butadiene in a hydrocarbon solvent in the presence of an organolithium initiator, characterized by carrying out the copolymerization in the presence of a Lewis base or a combination of a Lewis base and an anionic surface active agent containing —SO$_3$M or —OSO$_3$M, wherein M is Na, K, Rb or Cs under temperature-raising conditions.

7. A process as claimed in claim 6, wherein the Lewis base is an ether or tertiary amine having a high Lewis basicity.

8. A process as claimed in claim 6 or 7, wherein the Lewis base is ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, tetraethylene glycol dimethyl ether, tetrahydrofuran, 2-methoxytetrahydrofuran, 2-methoxymethyltetrahydrofuran, 2,5-dimethoxymethyltetrahydrofuran, dioxane, N,N,N',N'-tetramethylethylenediamine, N,N,N',N'-tetraethylethylenediamine, triethylenediamine, N-methylmorpholine or N-ethylmorpholine.

9. A process as claimed in claim 8, wherein the amount of the Lewis base used is 0.2 to 500 moles per gram atom of the lithium in the organolithium initiator.

10. A process as claimed in claim 9, wherein the anionic surface active agent is an alkylsulfonate, an amide-bound sulfonate, an ester-bound sulfonate, a sulfuric ester salt of a higher alcohol, or an ester-bound sulfuric ester salt.

11. A process as claimed in claim 10, wherein the amount of the anionic surface active agent used is 1.0 gram atom or less (alkali metal atom bais) per gram atom of the lithium in the organolithium initiator.

12. A process as claimed in claim 11, wherein the polymerization initiation temperature is from −20° C. to 50° C. and the difference between the polymerization initiation temperature and the maximum temperature in the course of the polymerization or at the end of the polymerization is at least 40° C.

13. A process as claimed in claim 12, wherein the maximum temperature is 130° C. or less.

14. A process as claimed in claim 13, wherein the hydrocarbon solvent is an alicyclic hydrocarbon or an aliphatic hydrocarbon.

15. A process as claimed in claim 14, wherein the amount of the hydrocarbon solvent used is 1 to 20 parts by weight per part by weight of the monomers.

* * * * *